Aug. 12, 1947.   F. D. BRADDON   2,425,300
GYROSCOPIC HORIZON
Filed May 27, 1944

INVENTOR
F. D. BRADDON
BY
Herbert J. Thompson
HIS ATTORNEY

Patented Aug. 12, 1947

2,425,300

UNITED STATES PATENT OFFICE 2,425,300

GYROSCOPIC HORIZON

Frederick D. Braddon, Babylon, N. Y., assignor to Sperry Gyroscope Company, Inc., a corporation of New York Application May 27, 1944, Serial No. 537,583

4 Claims. (Cl. 74—5)

This invention relates to gyroscopic artificial horizons, sometimes known as gyro-verticals which are employed not only as visual indicators, but also as base lines from which to control the lateral and longitudinal stability of aircraft and of sighting and radar equipment on ships and aircraft. Such gyroscopes are usually mounted in substantially neutral equilibrium, or made slightly pendulous, and are maintained in their normal position by gravitationally controlled erecting devices, such as pendulums or liquid level devices which govern a source of power applying a torque substantially normal to the direction of tilt. Such gravitationally responsive erecting devices, however, cause temporary errors in the position of the gyro-vertical which persist for some time after the aircraft is subjected to acceleration forces, the most troublesome and most recurrent of which are those due to turning of the craft.

As a turn progresses, due to the shifting viewpoint of the pilot with respect to the gyroscope's position in space, the resultant error appears on the instrument as a gradually increasing error, first in combined roll and pitch and then mainly as a downward pitch as a 180° turn is approached. The rate of this precession is greater than the conventional erecting system about the pitch axis can correct for and hence persists after a turn for some time. The aforementioned resulting error in pitch due to turns usually reaches a maximum in the vicinity of a 180° turn, and the amount of the error is a direct function of the strength of the erection force controlled by the roll or bank detecting pendulums.

According to my present invention, I propose to decrease this pitch error which always appears as a downward pitch, by altering the relative value of the erection forces exerted about the roll and pitch axis, so that the former is much less than the latter or by what amounts to the same thing, that the latter is much greater than the former. By keeping the forces controlled by the roll pendulums at a minimum, the total downward pitch of the gyro is reduced, and by increasing the forces of the pitch pendulums such downward pitch is further reduced and quickly eliminated. It should be understood that during a turn, if the air speed of the craft is maintained there are no accelerations acting on the pitch responsive erection devices other than gravity. Therefore, the pitch erecting system acts normally throughout the turn and does not give rise to any error in bank.

My invention has a special application and advantage when used in connection with the type of inclined gyroscope shown and claimed in my prior application Serial No. 388,736, filed April 16, 1941, for Gyro-verticals. According to said prior application, I substantially eliminate the pitch error above referred to by slightly inclining the gyro spin axis forwardly on the aircraft, as fully explained with the reasons therefor in my aforesaid application.

By applying my present invention to this type of gyroscope, I gain at least two important advantages: (1) I am enabled to reduce the forward inclination of the gyroscope to an angle on the order of 2° or 3°, so that the conical precession of the gyroscope during turns due to the inclination and acceleration forces becomes quite small.

To appreciate the second advantage of my invention, it should be remembered than an inclined gyroscope is not a complete solution to the problem except under predetermined flight conditions. As discussed in my prior application, the inclined gyroscope is only a complete solution (in the case of an on-off erection system such as disclosed herein) in case the craft is making a turn at a rate for which the instrument was designed, which is usually a procedure turn. Therefore, for a turn at any other rate, a small pitch error will appear.

In my invention I not only am able to decrease the angle of the tilt of the gyro, but also to greatly reduce the small pitch error above referred to because the resulting pitch error is lessened by reducing the erection forces due to the roll pendulums as compared to those controlled by the pitch pendulums.

In my present invention. I have also made a further improvement in my prior invention which enables my invention to be used in gyroscopes which are made slightly pendulous (as is frequently done), as well as in truly neutral gyroscopes. If the gyroscope is made slightly pendulous, it is found that after a turn the gyroscope will be inclined slightly laterally to one side or the other dependent upon the direction the rotor is spinning, but independent of the direction of turn. Therefore, in case the gyroscope is made slightly pendulous, I propose not only to incline the gyro to the rear, but also to incline it to the right or left. In other words, I incline the gyroscope in the direction of flight in a diagonal plane, but position the horizon bar normally horizontal and centered on the dial so that the observer is not confused. Unequal erection forces are also preferably retained.

Referring to the drawings showing two forms of my invention,

Figures 1, 2, 3:
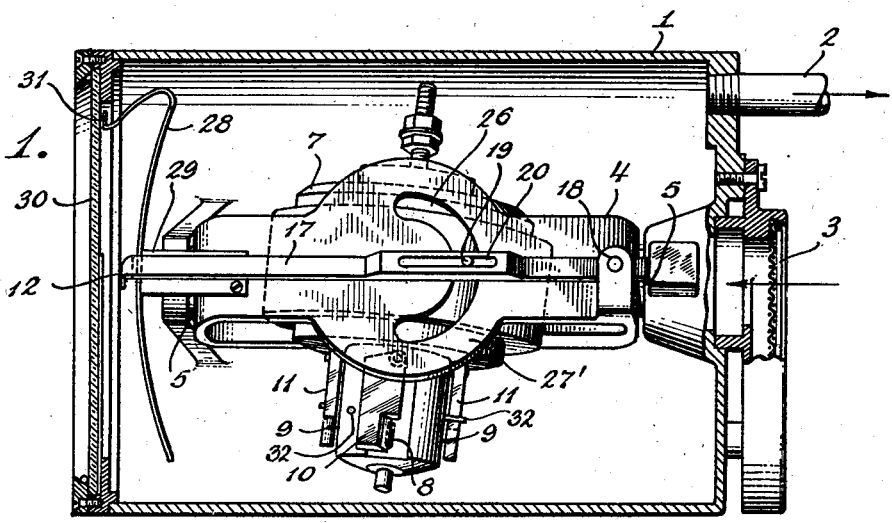
Fig. 1 is a side elevation partly in section showing my invention in the form in which the gyro is inclined on a diagonal, thus having both forward and lateral component inclination.
Fig. 2 shows a front view of the same, partly in section.
Fig. 3 shows a perspective view of the gyro unit alone, but showing my invention applied to a gyroscope whose axis is truly vertical.

My invention is shown as applied to an airspun, air-directed type of gyroscope having an outer casing 1 from which the air may be exhausted by pump connection 2, air entering the casing through the screened aperture 3 to pass within the gimbal system for spinning the rotor and erecting the gyro as well understood in the art. The gimbal ring 4 is shown as journalled for oscillation within the casing 1 on major fore and aft axis 5—5, and within the gimbal the rotor casing 7 is journalled for oscillation about the substantially transverse minor axis 6—6.

Within the rotor casing 7, the rotor (not shown) is journalled on a nearly vertical spinning axis preferably inclined forwardly and laterally on the craft on a slight angle for reasons hereinafter explained. The exhaust air merges through two pairs of slots near the bottom of the case; namely, a pair of slots 8—8 facing laterally on the craft, and a pair of slots 9—9 facing fore and aft on the craft. The former are controlled by a pair of pendulums 10, pivoted about a transverse or pitch axis and may hence be referred to as the pitch ports and pitch pendulums. The latter ports are controlled by a pair of interconnected pendulums 11, pivoted about the fore and aft or roll axis of the craft, and are referred to herein as the roll ports and pendulums. Stop pins 32 limit the swing of the pendulums. During turns, the centrifugal force is usually strong enough to swing the roll pendulums 11 against a stop so that one port 9 is fully open and the other fully closed. This type of erection may be generally described as of the on-off type, that is in straight flight it is normally entirely off and in turns it is full on.

In the type of artificial horizon shown in Figs. 1 and 2, the horizon is indicated by normally horizontal bar 12 extending across the face of the instrument and having distinctive parallel spaced lines 25, 25' thereon. In level flight these markings match up with the U-shaped index 13 on each side of the bezel ring 16. When the plane pitches downwardly, the horizon bar apparently moves up, being stabilized by the gyroscope, and thus moves in the same direction that the horizon appears to move. When the plane banks to the right or left, the horizon bar likewise apparently tilts to the left or right. To this end, the bar is usually secured to a rearwardly extending arm 17 pivoted at 18 to the one side of the gimbal ring 4, and also has a pin and slot connection 19, 20 with the gyro casing 7, the pin 19 normally extending from the case through an arcuate slot 26 in the enlarged portion 27' of the gimbal ring. By this means the horizon bar is caused to tilt laterally with the gimbal ring and to move up and down reversely as to the gyro casing. A mask 28 is secured to a bracket 29 extending from the front of the gimbal ring past the forward pivot 5, the mask concealing the gyroscope from view through the front window 30, so that the horizon bar 12 which extends around the front of the mask is the principal element observed. The mask may also have an index 31 readable upon a banking scale 32 on the bezel.

According to my invention, I increase the erection force due to the pitch pendulums with respect to the erection forces due to the roll pendulums by making the slots 8—8 of greater area than the slots 9—9. Good results are secured if the slots 8 are made about double the area of the slots 9. By thus decreasing the relative erection force controlled by the roll pendulums, I am able to decrease the tilt of the gyroscope, which otherwise would be necessary under the theory of the inclined gyroscope, as pointed out hereinbefore in my prior application.

As stated above, I also prefer to incline the gyroscope to one side to similarly correct for roll error due to pendulousness of the gyroscope. By making the gyroscope slightly pendulous, caging devices may be dispensed with and the starting up period reduced because the gyroscope will be substantially vertical if it is somewhat pendulous. Figs. 1 and 2 therefore show the gyroscope as inclined both forwardly and laterally. This inclination is normally maintained by slightly offsetting the ports and shutters about each axis so that no erection force is exerted on the gyroscope at this predetermined inclination in this oblique plane. As before, the inclination is so chosen with respect to the gyroscopic constants, such as the moment of inertia and period, that the lateral inclination is maintained during turns by the precession of the gyroscope caused by the action of centrifugal force on the pendulous factor of the gyroscope, while the forward inclination is similarly maintained by the precession of the gyroscope caused by the unbalanced erection forces exerted by jets 9 as shutters 10 are displaced by centrifugal force so that the gyroscope remains apparently in the same position with respect to the observer on the craft.

Although the gyro is thus inclined in an oblique plane, the instrument is so designed that the indications apparent to the observer show the true horizon (or vertical, dependent on the point of view) with the gyro in such inclined position. If the indicator is of the well-known horizon bar type, such as shown in Figs. 1 and 2, this may be effected by altering slightly the usual connections of the bar to the gyroscopic system so that the visible portion of the horizon bar 12 lies truly horizontal and in the same horizontal plane as the pitch indices 13 on the bezel 16 when the gyroscope is inclined at the predetermined angle in the proper plane. Although the gimbal ring is shown as slightly inclined with the gyro about the fore and aft pivots 5, 5, the pivotal connection 18 of arm 17 to the gimbal or the bar itself are so constructed that the visible portion or the horizon bar 12 itself is not inclined, but extends truly horizontally, as stated, although the ring may be slightly tilted sidewise at this predetermined angle. Also, the pin and slot connection 19, 20 of the rearward extension 17 to the gyro casing is slightly offset so that although the gyro is inclined forwardly, as shown, the bar 12 is located normally at the mid or zero position on the dial, with lines 25, 25' matching the U-index 13.

In Fig. 3, the gyro-casing alone is shown in perspective, showing the difference in the size of the erection ports 8 and 9. The gyro here is shown as truly vertical and without any specific indicator system or control system.

It will also be understood, of course, that although I have only shown my invention as applied to an air blast erected gyroscope artificial horizon, it is equally applicable to other forms in which different types of erection devices may be used, or different types of indicators; for instance, as employed in the so-called "attitude" gyroscope shown in the copending application of O. E. Esval, W. Wrigley and R. Haskins, Jr., Serial No. 445,760, filed June 4, 1942, wherein the indicator is in the form of a graduated truncated sphere.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. As a means for preventing observable errors in a gyroscopic artificial horizon or gyro-vertical due to turning of the craft, a universally and pendulously mounted gyroscope normally inclined at a predetermined angle in an oblique plane with respect to the craft, power-operated erection devices about the roll and pitch axes of the craft, and gravitationally responsive means controlling said devices, the pendulosity of said gyroscope and the strength of said erection devices being so constructed and arranged with respect to the gyroscopic constants as to cause precession of the gyroscope during turns at the same rate as the craft turns, whereby no change in position of the gyroscope takes place which is apparent to the pilot.

2. A gyroscopic artificial horizon as claimed in claim 1, in which the erection device for roll is of less power than the erection device for pitch.

3. As a means for preventing observable errors in a gyroscopic artificial horizon due to turns, the combination with such a universally mounted gyroscope, a power-operated erection device for exerting torques about the roll axis of the craft, a similar device for exerting torques about the pitch axis, gravitational means controlling said devices responsive to relative tilt about said pitch and roll axes, respectively, the first device and its control means being so constructed and arranged as to cause said gyroscope to remain normally forwardly inclined at a predetermined angle with respect to the craft and the second device and its control means being so constructed and arranged with respect to the gyroscope as to cause precession thereof during turns at the same rate as the craft turns, whereby little change in position of the gyroscope takes place which is apparent to the pilot, and the first means being relatively of greater power than the second means, whereby such change is further reduced and quickly eliminated after a turn.

4. Means for reducing the pitch error following turns of the aircraft in gyroscopic artificial horizons for aircraft having gravitationally controlled power erection devices for restoring the gyro to its normally substantially vertical position about the roll and pitch axes thereof, characterized by so constructing and arranging said devices that the pitch erection device causes the gyroscope to remain normally slightly forwardly inclined and has an erection rate relatively substantially greater than that of the roll erection device, and the roll erection device causes such forward inclination to be maintained during turns.

FREDERICK D. BRADDON.

REFERENCES CITED

The following references are of record in the file of this patent:

UNITED STATES PATENTS

| Number | Name | Date |
| --- | --- | --- |
| 2,366,543 | Meredith | Jan. 2, 1945 |
| 2,044,150 | Carlson | June 16, 1936 |
| 1,982,636 | Carlson | Dec. 4, 1934 |